United States Patent [19]
Naitou et al.

[11] Patent Number: 5,335,979
[45] Date of Patent: Aug. 9, 1994

[54] CONTROL DEVICE FOR VEHICLE INCLUDING ANTI-SKID BRAKING SYSTEM AND POWER STEERING CONTROL SYSTEM

[75] Inventors: Yasuo Naitou; Shunichi Wada; Kazumichi Tsutsumi; Shinichi Kohge, all of Himeji, Japan

[73] Assignee: Mitsubishi Denki Kabushiki Kaisha, Tokyo, Japan

[21] Appl. No.: 132,281

[22] Filed: Oct. 6, 1993

[30] Foreign Application Priority Data

Oct. 9, 1992 [JP] Japan .................................. 4-271970
Oct. 13, 1992 [JP] Japan .................................. 4-274333

[51] Int. Cl.$^5$ .......................... B62D 5/04; B60T 8/32
[52] U.S. Cl. ................................... 303/100; 180/79.1; 303/92; 303/91; 364/424.05
[58] Field of Search ............... 180/79.1; 303/100, 102, 303/110, 107, 96, 92, 91, 112; 364/424.05, 426.01, 426.02, 426.03; 188/181 A, 181 R, 181 T

[56] References Cited

U.S. PATENT DOCUMENTS 4,957,182  9/1990  Morishita et al. .
5,104,204  4/1992  Naito et al. .
5,259,473 11/1993  Nishimoto .......................... 180/79.1

Primary Examiner—Douglas C. Butler
Attorney, Agent, or Firm—Sughrue, Mion, Zinn, Macpeak and Seas

[57] ABSTRACT

A unified control device for a vehicle including an anti-skid braking system and power steering control system is controlled by two microcomputers (4B and 24B). On the basis of the outputs of the torque sensors (1a and 1b, etc.), the first microcomputer (4B) determines the driving direction and torque of the DC motor (9) providing the assisting steering torque for the steering wheel, and outputs the torque signal (T) and the first direction signal (D1) for the DC motor (9). The second microcomputer (24B) generates the brake operation signal (B) on the basis of the outputs of the road wheel velocity sensors (21a through 21d) and the brake switch (22). Further, on the basis of the output of the torque sensors (1a and 1b), the microcomputer (24B) determines the direction of the DC motor (9), and outputs the second direction signal (D2). The motor drive circuit (8) drives the DC motor (9) in accordance with the torque signal (T) and the direction command signal (D), which is output from the AND circuit (40) only when the first and second direction signals (D1 and D2) coincide. Further, the microcomputers (4B and 24B) output first and second fail-safe relay energization signals (F1 and F2), respectively, when the power steering control system and the anti-skid braking system are judged to be operating normally. The power supply control circuit (42) immediately opens the fail-safe relay unit (6B) when neither the first and second signals (F1 and F2) are supplied. However, in the case where only one of the first and second signals (F1 and F2) are supplied, the power supply control circuit (42) defers the interruption of the fail-safe relay unit (6B) until the vehicle stops.

5 Claims, 6 Drawing Sheets

CONTROL DEVICE FOR VEHICLE INCLUDING ANTI-SKID BRAKING SYSTEM AND POWER STEERING CONTROL SYSTEM

BACKGROUND OF THE INVENTION

This invention relates to control devices for vehicles, and more particularly to control devices including: the anti-skid braking system for controlling the braking force on the basis of the velocity information of the road wheels of the vehicle, and the power steering control system for providing an assisting steering torque on the basis of the information upon the steering torque and the vehicle velocity.

Generally, the anti-skid braking system and the power steering control system for vehicles are implemented separately. FIG. 5 is a block diagram showing the structure of a conventional power steering control system of a vehicle. A torque sensor 1 detects the steering torque of the steering wheel 100 of the vehicle. The first and the second vehicle velocity sensors 2a and 2b detect the velocity of vehicle relative to the ground. The outputs from the torque sensor 1, the first and the second vehicle velocity sensors 1a and 1b, etc., are input through the interface 3 to a main microcomputer 4 and a sub-microcomputer 5 of the control device. The main microcomputer 4 calculates the requisite assisting steering torque, etc., on the basis of the steering torque information and the vehicle velocity relative to the ground, input through the interface 3. The sub-microcomputer 5 performs similar calculations as the main microcomputer 4 based on similar inputs.

A fail-safe relay 6 is coupled to the main microcomputer 4 and the sub-microcomputer 5. The fail-safe relay 6 is activated upon receiving the outputs from the main microcomputer 4 and the sub-microcomputer 5, to supply the power of the battery 7 to a motor drive circuit 8 and a clutch drive circuit 10, etc. The motor drive circuit 8 coupled to the main microcomputer 4 and the sub-microcomputer 5 outputs the drive signal to a DC motor 9 providing an assisting steering torque, on the basis of the outputs from the microcomputers 4 and 5. The clutch drive circuit 10 outputs the drive signal to the clutch 11 on the basis of the output received from the main microcomputer 4.

The power steering control system of FIG. 5 thus includes two microcomputers 4 and 5, and the control signal is output when the outputs of the two microcomputers coincide with respect to the driving condition of motor drive circuit 8. The control device is fail-safe in that the control signal is output only when the results of the calculations of the two microcomputers are the same.

FIG. 6 is a block diagram showing the structure of a conventional anti-skid braking system of a vehicle. The road wheel velocity sensors 21a through 21d detect the velocities of the road wheels of the vehicle. A brake switch 22 is activated upon operation of the brake by the driver of the vehicle. The outputs from the road wheel velocity sensors 21a through 21d and the brake switch 22, etc., are supplied to a master microcomputer 24 and a slave microcomputer 25 through an interface 23. The master microcomputer 24 calculates the brake operation signal for the road wheels (namely, the control signal for increasing and decreasing the braking pressure) on the basis of the information upon the velocity of the road wheels and the braking operation. The slave microcomputer 25 performs similar calculations as the master microcomputer 24 based on similar inputs.

A watch dog circuit 26 monitors the operations of the master microcomputer 24 and the slave microcomputer 25. The drive circuit 27 takes the logical product, for example, of the outputs of the microcomputers 24 and 25 and the watch dog circuit 26, to generate the drive signal for a fail-safe main relay 28. Upon receiving the drive signal from the drive circuit 27, the fail-safe main relay 28 is energized to supply the power from the battery 29 to a valve drive circuit 30 and a hydraulic unit 31, etc.

On the basis of the outputs received from the master microcomputer 24, the valve drive circuit 30 supplies the drive signals to the hydraulic unit 31. Upon receiving a drive signal, the hydraulic unit 31 activates a built-in electromagnetic valve thereof, thereby adjusting the pressure of the master cylinder supplied to the wheel cylinders.

The anti-skid braking system of FIG. 6 thus includes two microcomputers 24 and 25, and the watch dog circuit monitors the operations of the two microcomputers to judge whether or not the microcomputers are operating normally. Unless the two microcomputer operate normally, the fail-safe function is put into operation to ensure the safety of the vehicle. The recent anti-skid braking system thus generally includes two microcomputer with an increased redundancy, to provide for increased safety.

The conventional control device for a vehicle thus includes a power steering control system and an anti-skid braking system that are implemented separately. The power steering control system and the anti-skid braking system each include two microcomputers to ensure safety. The information upon the steering torque and the vehicle velocity is necessary for the power steering control system and the information upon the velocity of the road wheels is necessary for the anti-skid braking system. The control device including a number of microcomputers becomes large-sized and expensive. The wiring of the vehicle harness (i.e., the signal lines) becomes complicated. Further, if the power steering control system and the anti-skid braking system are combined and unified mechanically, the failure of the one system results in the halting of operation of the other and the fail-safe functions thereof may be nullified.

SUMMARY OF THE INVENTION

It is therefore an object of this invention to provide a unified control device for a vehicle including an anti-skid braking system and a power steering control system, which is simplified in circuit structure and is reduced in production and maintenance cost, while maintaining a reliable fail-safe function.

The above object is accomplished in accordance with the principle of this invention by a control device for a vehicle which includes: torque sensor means for determining a torque of the steering wheel; road wheel velocity sensor means for detecting velocities of road wheels of the vehicle; brake sensor means for detecting an operation of a brake of the vehicle; first control means, coupled to the torque sensor means, for determining a driving direction and a driving torque of the electric motor on the basis of an output of the torque sensor means, the first control means generating a first direction signal and a torque signal for the electric motor on the basis of the driving direction and the driving torque of the electric motor determined by the first control means; second control means, coupled to the torque sensor means, the road wheel velocity sensor means and the brake sensor means, for generating a brake operation signal for the anti-skid braking system on the basis of outputs of the road wheel velocity sensor means and the brake sensor means, wherein the second control means determines a driving direction of the electric motor on the basis of the output of the torque sensor means and outputs a second direction signal for the electric motor on the basis of the direction of the electric motor determined by the second control means; logical circuit means, coupled to the first and second control means, for generating a direction command signal, coinciding with the first and second direction signals, only when the first and second direction signals output from the first and second control means, respectively, coincide; and motor drive circuit means coupled to the first control means and the logical circuit means, the motor drive circuit means driving the electric motor in accordance with the torque signal and the direction command signal.

Preferably, the first and the second control means include means, respectively, for judging whether or not the power steering control system and the anti-skid braking system are operating normally, and output a first and a second fail-safe relay energization signal, respectively, when the power steering control system and the anti-skid braking system are judged to be operating normally; the control device further including a fail-safe relay unit for controlling a power supply to the power steering control system and the anti-skid braking system, in accordance with the first and second fail-safe relay energization signal.

It is further preferred that the control device includes a second logical circuit means having inputs coupled to the first and second control means, the second logical circuit means generating a third fail-safe relay energization signal only when both the first and second fail-safe relay energization signals are output from the first and second control means, respectively; wherein the fail-safe relay unit is coupled to an output of the second logical circuit means and includes a single fail-safe relay which is turned on to supply power to the anti-skid braking system and the power steering control system when the third fail-safe relay energization signal is output.

Still preferably, the fail-safe relay unit includes a single fail-safe relay for controlling current supply to the anti-skid braking system and the power steering control system; and the control device further comprises: power supply control circuit means having inputs coupled to the first and second control means and controlling the single fail-safe relay of the fail-safe relay unit; wherein the power supply control circuit means turns on the single fail-safe relay to supply power to the anti-skid braking system and the power steering control system when both the first and second fail-safe relay energization signals are output, immediately interrupts the single fail-safe relay when neither the first nor the second fail-safe relay energization signals is output, and interrupts the single fail-safe relay after a deferment when only one of the first and second fail-safe relay energization signals is output. More specifically, it is preferred that the power supply control circuit means defers interruption of the single fail-safe relay until the vehicle stops, when only one of the first and second fail-safe relay energization signals is output.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
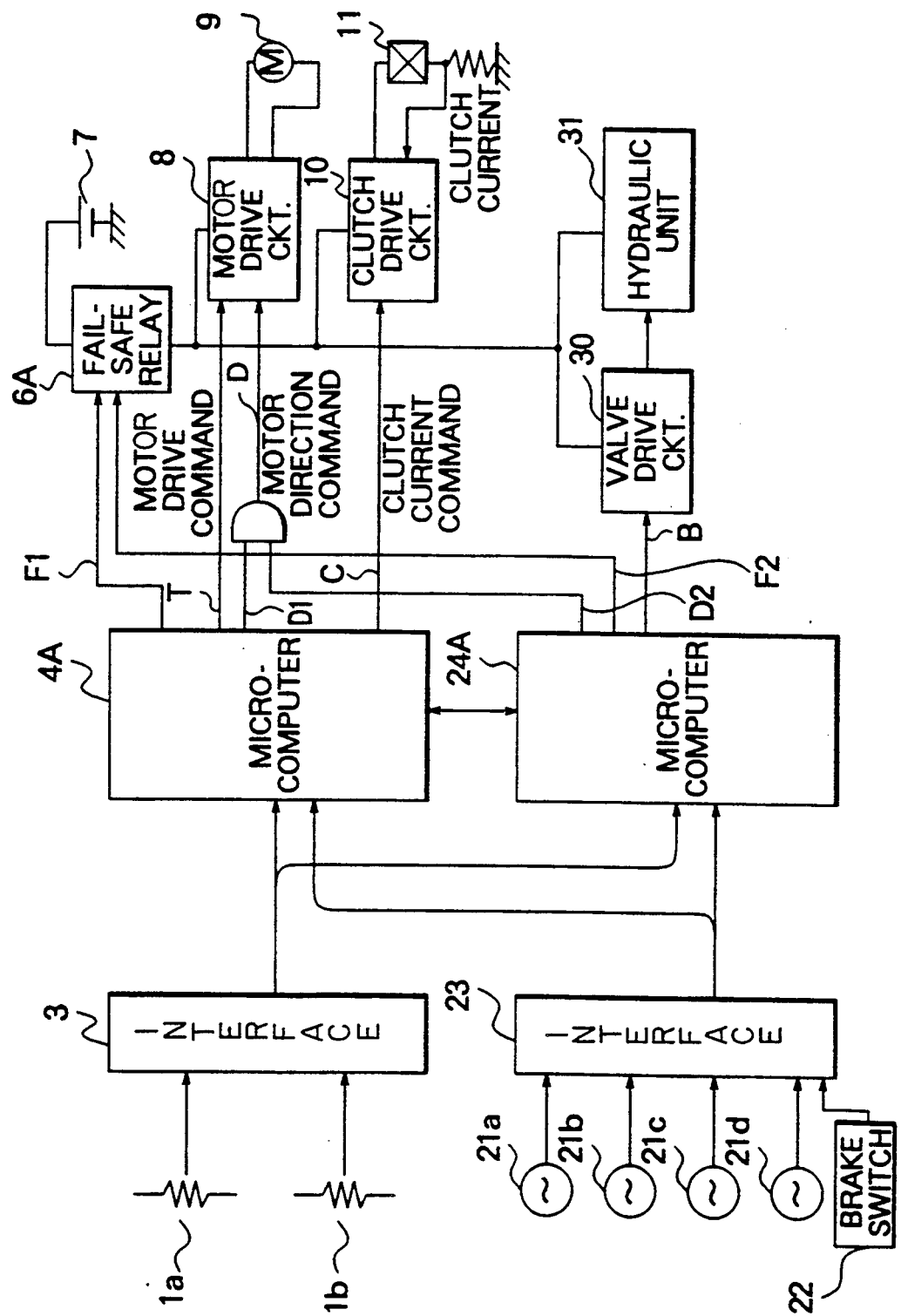
FIG. 1 is a block diagram showing the structure of a control device for a vehicle according to this invention.
Figure 5:
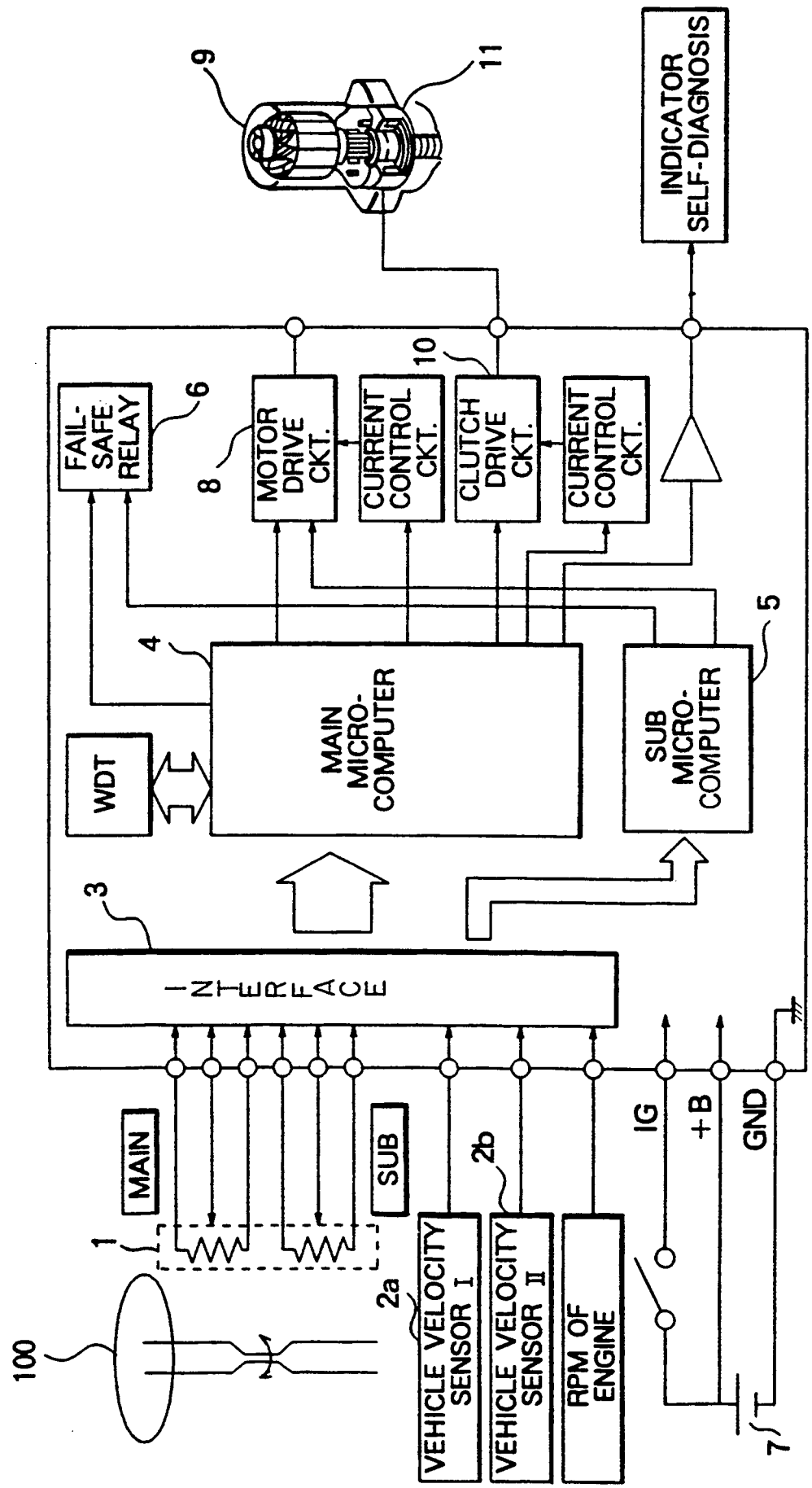
FIG. 5 is a block diagram showing the structure of a conventional power steering control system of a vehicle.
Figure 6:
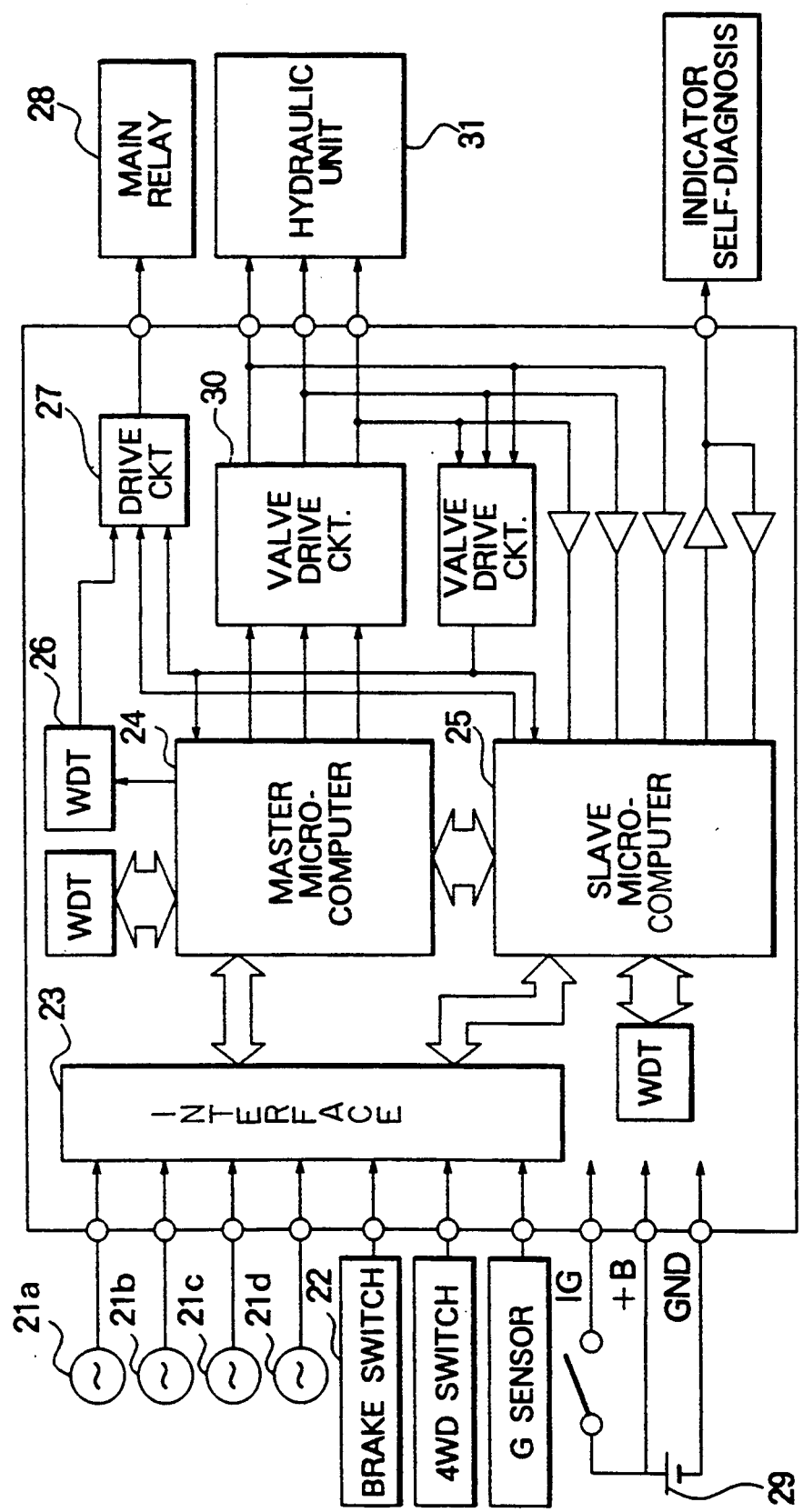
FIG. 6 is a block diagram showing the structure of a conventional anti-skid braking system of a vehicle.

FIG. 1 is a block diagram showing the structure of a control device for a vehicle according to this invention, wherein the parts corresponding to those of FIGS. 5 and 6 are designated by like reference numerals. The DC motor 9, driven by the motor drive circuit 8, provides the assisting steering torque for the steering wheel of the vehicle. When engaged, the clutch 11, driven by the clutch drive circuit 10, connect the output torque of the DC motor 9 to the steering wheel. Upon receiving a drive signal from the valve drive circuit 30, the hydraulic unit 31 activates a built-in electromagnetic valve thereof, and thereby adjusts the pressure of a master cylinder supplied to the wheel cylinders for exerting the braking force on respective road wheels.

Torque sensors 1a and 1b detect the steering torque or the steering angle of the steering wheel (not shown). A microcomputer 4A determines the driving direction and the driving torque of the DC motor 9 on the basis of the outputs of the torque sensors 1a and 1b input through the interface 3, on the one hand, and outputs of the road wheel velocity sensors 21a through 21d input through the interface 23, on the other. On the basis of the driving direction and the driving torque thus determined, the microcomputer 4A generates the direction signal D1 and the torque signal T for the DC motor 9.

A fail-safe relay unit 6A includes two relays: one for the power steering control system controlled by the microcomputer 4A and another for anti-skid braking system controlled by a microcomputer 24A. The relays of the fail-safe relay unit 6A are energized upon receiving the output signals F1 and F2 from the microcomputers 4A and 24A, respectively. When energized, the relay for the power steering control system controlled by the microcomputer 4A supplies the power from the battery 7 to the motor drive circuit 8 and the clutch drive circuit 10, and the relay for the anti-skid braking system controlled by the microcomputer 24A supplies the power from the battery 7 to the valve drive circuit 30 and the hydraulic unit 31.

On the basis of the outputs of the road wheel velocity sensors 21a through 21d and the brake switch 22 input through the interface 23, the microcomputer 24A generates the brake operation signal B. Further, on the basis of the outputs of the torque sensors 1a and 1b, the microcomputer 24A determines at least the driving direction of the DC motor 9, and generates on the basis of thereof the direction signal D2 for the DC motor 9. Thus, the microcomputer 24A performs not only the anti-skid braking control (the intrinsic control function of the microcomputer 24A), but also the power steering control. The microcomputer 4A and 24A are coupled to each other for mutual communication.

An AND circuit 40 coupled to the microcomputers 4A and 24A opens the gate thereof and outputs the direction signal D to the motor drive circuit 8 only when the direction signals D1 and D2 of the microcomputers 4A and 24A coincide. When the direction signals output from the microcomputers 4A and 24A disagree during a predetermined length of time, the two relays of the fail-safe relay unit 6A are de-energized to interrupt the power supplied from the battery 7 to the respective parts 8, 10, 30, and 31 of the power steering control system and the anti-skid braking system. The occurrence of such disagreement may be detected via the communication between the microcomputers 4A and 24A.

Next, the operation of the circuit of FIG. 1 is described. Upon commencement of the operation of the vehicle, the microcomputer 4A confirms the operation of the power steering control system on the basis of the outputs of the respective sensors. If the operation of the power steering control system is thus determined to be normal, the microcomputer 4A outputs the fail-safe relay energization signal F1 to put the power steering control system into operation, thereby supplying the power from the battery 7 to the motor drive circuit 8 and the clutch drive circuit 10. Similarly, upon commencement of the operation of the vehicle, the microcomputer 24A confirms the operation of the anti-skid braking system on the basis of the outputs of respective sensors. If the operation of the anti-skid braking system is determined to be normal, the microcomputer 24A outputs the fail-safe relay energization signal F2 to put the anti-skid braking system into operation, thereby supplying the power from the battery 7 to the valve drive circuit 30 and the hydraulic unit 31.

The microcomputer 4A then supplies the clutch current command signal C to the clutch drive circuit 10, such that the clutch drive circuit 10 outputs a PWM (pulse-width modulated) drive signal to the clutch 11. The clutch current level of the clutch 11 is fed back to the clutch drive circuit 10, such that occurrences of abnormality of the clutch 11 may be detected.

The microcomputer 4A reads in the steering torque information generated by the torque sensors 1a and 1b at the operation of the steering wheel. Further, the microcomputer 4A receives the road wheel velocity information from the road wheel velocity sensors 21a through 21d. The microcomputer 4A determines the driving direction of the DC motor 9 on the basis of the steering torque information, and the driving torque of the DC motor 9 on the basis of the steering torque information and the road wheel velocity information. On the basis of the driving direction and the driving torque of the DC motor 9 thus determined, the microcomputer 4A generates the direction signal D1 and the torque signal T for the DC motor 9.

On the other hand, the microcomputer 24A reads in, through the interface 23, the road wheel velocity information from the road wheel velocity sensors 21a through 21d and the braking force information from the brake switch 22. On the basis of the road wheel velocity information and the braking force information, the microcomputer 24A generates the braking operation signal B for the road wheels, which is the signal for controlling the anti-skid braking system. Further, the microcomputer 24A reads in the steering torque information supplied from the torque sensors 1a and 1b at the operation of the steering wheel, and determines on the basis of the steering torque information the driving direction of the DC motor 9. On the basis of the driving direction thus determined, the microcomputer 24A generates the direction signal D2 for the DC motor 9.

When the direction signals D1 and D2 from the microcomputers 4A and 24A coincide, the AND circuit 40 opens the gate thereof and outputs the motor direction command signal D to the motor drive circuit 8. The direction command signal D is identical to the direction signals D1 and D2 when the signals D1 and D2 coincide. Upon receiving the motor direction command signal D supplied from the AND circuit 40 and the torque signal T (i.e., the motor drive command signal) which is continuously supplied from the microcomputer 4A, the motor drive circuit 8 is activated and outputs the drive signal to the DC motor 9, thereby driving the DC motor 9. The braking operation signal B for the road wheels output from the microcomputer 24A is supplied to the valve drive circuit 30. Upon receiving the signal B, the valve drive circuit 30 activates the hydraulic unit 31 and performs the control of the anti-skid braking system.

By the way, when the disagreement of the direction signals D1 and D2 from the two microcomputers 4A and 24A continues for a predetermined length of time and the abnormality is thus maintained for the period, the microcomputer 24A de-energizes the relay for the anti-skid braking system within the fail-safe relay unit 6A, and, via the communication between the two microcomputers 4A and 24A, let the microcomputer 4A to de-energize the relay for the power steering control system within the fail-safe relay unit 6A. Thus the power supply to the circuits of the anti-skid braking system as well as to the circuits of the power steering control system is interrupted. This power supply interruption function may be performed by the microcomputer 4A instead of the microcomputer 24A.

As described above, the microcomputer 24A, which is intrinsically performs the control of the anti-skid braking, also performs the function of monitoring the operation of the microcomputer 4A for controlling the power steering. The DC motor 9 of the power steering control system is driven only when the direction signals of the two microcomputers 4A and 24A coincide. The two microcomputers 4A and 24A essentially combine the functions of the microcomputers which are provided separately for the power steering control system and the anti-skid braking system in the case of the conventional control device of FIGS. 5 and 6. The control device is thus reduced according to this invention both in size and production cost. Further, the harness of the vehicle (the wiring of the signal lines upon the vehicle) becomes simplified and the fail-safe function can be maintained with a simplified wiring configuration and a reduced installation cost.

Figure 2:
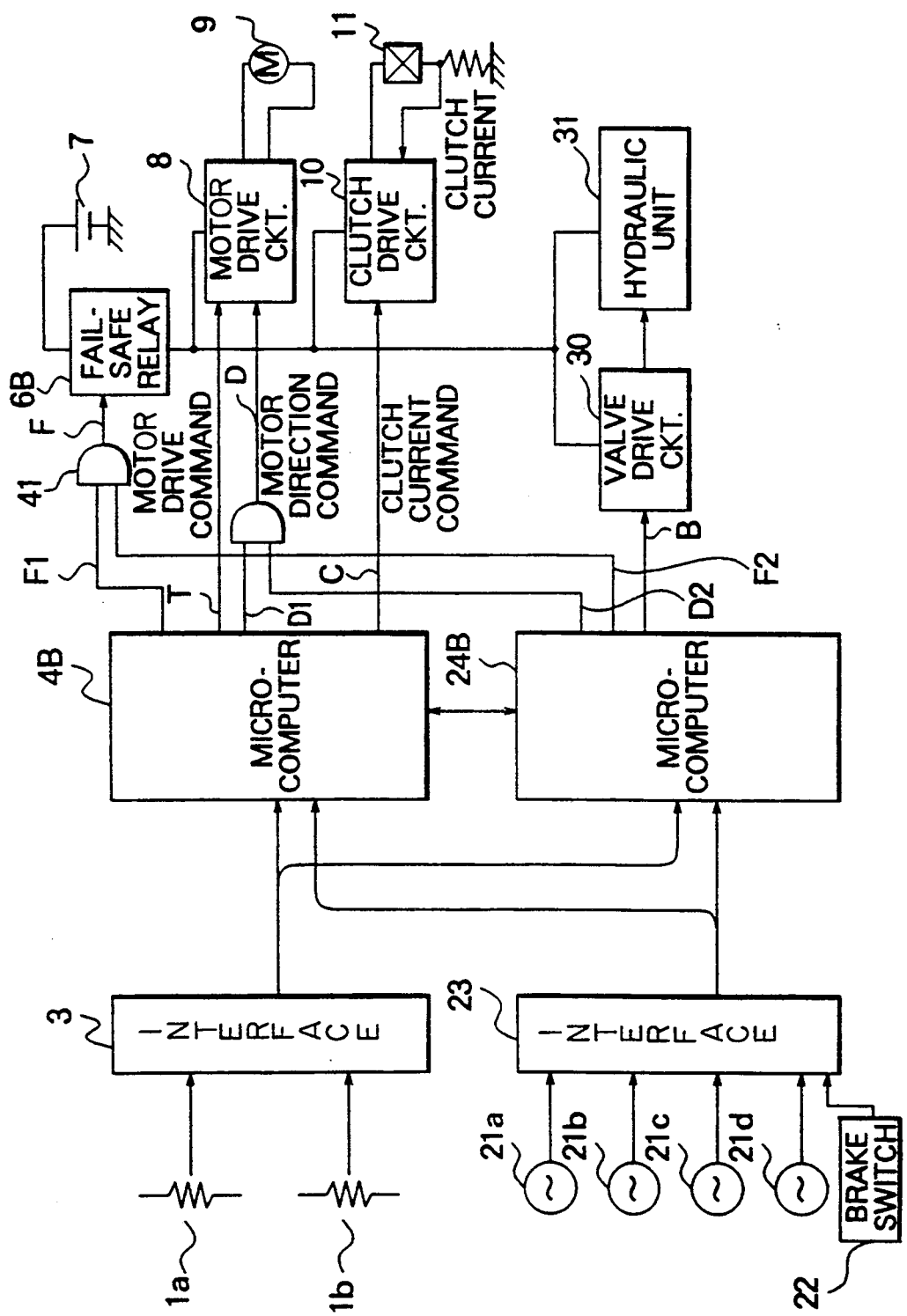
FIG. 2 is a block diagram showing the structure of another control device for a vehicle according to this invention.

FIG. 2 is a block diagram showing the structure of another control device for a vehicle according to this invention. The parts corresponding to those of FIG. 1 are designated by like reference numerals, and the description thereof is generally omitted.

A microcomputer 4B determines the driving direction and the driving torque of the DC motor 9 on the basis of the outputs of the torque sensors 1a and 1b input through the interface 3, on the one hand, and outputs of the road wheel velocity sensors 21a through 21d input through the interface 23, on the other. On the basis of the driving direction and the driving torque thus determined, the microcomputer 4B generates the direction signal and the torque signal for the DC motor 9. A fail-safe relay unit 6B has a function similar to that of the fail-safe relay unit 6A of FIG. 1, but includes only a single, relay which serves to control the power supply to both the power steering control system and the anti-skid braking system. On the basis of the outputs of the road wheel velocity sensors 21a through 21d and the brake switch 22 input through the interface 23, the microcomputer 24B generates the brake operation signal B. Further, on the basis of the outputs of the torque sensors 1a and 1b, the microcomputer 24B determines at least the driving direction of the DC motor 9, and generates on the basis of thereof the direction signal D2 for the DC motor 9. Thus, the microcomputer 24B serves not only for the anti-skid braking control, but also for the power steering control. The microcomputer 4B and the microcomputer 24B are coupled to each other for mutual communication.

An AND circuit 41 coupled to the microcomputers 4B and 24B outputs the fail-safe relay energization signal F only when a coincidence is found between the fail-safe relay energization signal F1 for operating the power steering control system output from the microcomputer 4B and the fail-safe relay energization signal F2 for operating the anti-skid braking system output from the microcomputer 24B. The AND circuit 40, coupled to output signals D1 and D2 of the microcomputers 4B and 24B, respectively, is similar to the AND circuit 40 of FIG. 1, and outputs the direction command signal D only when the signals D1 and D2 coincide.

Next, the operation of the circuit of FIG. 2 is described in detail. Upon commencement of the operation of the vehicle, the microcomputer 4B confirms the operation of the power steering control system on the basis of the outputs of the respective sensors. If the operation of the power steering control system is determined to be normal, the microcomputer 4B outputs the fail-safe relay energization signal F1 to put the power steering control system into operation. Similarly, upon commencement of the operation of the vehicle, the microcomputer 24B confirms the operation of the anti-skid braking system on the basis of the outputs of the respective sensors. If the operation of the anti-skid braking system is determined to be normal, the microcomputer 24B outputs the fail-safe relay energization signal F2 to put the anti-skid braking system into operation.

The energization signals F1 and F2 output from the microcomputers 4B and 24B are supplied to the AND circuit 41. When the two energization signal F1 and F2 coincide, the AND circuit 41 opens the gate thereof and outputs the fail-safe relay energization signal F to the fail-safe relay unit 6B, such that the fail-safe relay unit 6B is energized and the power from the battery 7 is supplied to the motor drive circuit 8 and the clutch drive circuit 10 of the power steering control system, on the one hand, and to the valve drive circuit 30 and the hydraulic unit 31 of the anti-skid braking system, on the other.

Further, the microcomputer 4B supplies the clutch current command signal C to the clutch drive circuit 10. In response to the signal C, the clutch drive circuit 10 outputs a PWM (pulse-width modulated) drive signal to the clutch 11. The clutch current level of the clutch 11 is fed back to the clutch drive circuit 10, for the purpose of detecting occurrences of abnormality of the clutch 11.

The microcomputer 4B reads in the steering torque information generated by the torque sensors 1a and 1b at the operation of the steering wheel. Further, the microcomputer 4B reads in the road wheel velocity information supplied from the road wheel velocity sensors 21a through 21d. The microcomputer 4B determines the driving direction of the DC motor 9 on the basis of the steering torque information, and the driving torque of the DC motor 9 on the basis of the steering torque information and the road wheel velocity information. On the basis of the driving direction and the driving torque of the DC motor 9 thus determined, the microcomputer 4B outputs the direction signal D1 and the torque signal T for the DC motor 9.

On the other hand, the microcomputer 24B reads in, through the interface 23, the road wheel velocity information from the road wheel velocity sensors 21a through 21d, and the braking force information from the brake switch 22. On the basis of the road wheel velocity information and the braking force information, the microcomputer 24B generates the braking operation signal B for the road wheels, which is the signal for controlling the anti-skid braking system. Further, the microcomputer 24B reads in the the steering torque information supplied from the torque sensors 1a and 1b at the operation of the steering wheel, and determines on the basis of the steering torque information the driving direction of the DC motor 9. On the basis of the driving direction of the DC motor 9 thus determined, the microcomputer 24A generates the direction signal D2 for the DC motor 9.

When the direction signals D1 and D2 from the microcomputers 4B and 24B coincide, the AND circuit 40 opens the gate thereof and outputs the motor direction command signal D to the motor drive circuit 8. Upon receiving the motor direction command signal D supplied from the AND circuit 40 and the torque signal T (i.e., the motor drive command signal) which is directly and continuously supplied from the microcomputer 4B, the motor drive circuit 8 is activated and outputs the drive signal to the DC motor 9. The DC motor 9 thus begins to be driven.

Further, the braking operation signal B for the road wheels output from the microcomputer 24B is supplied to the valve drive circuit 30. Upon receiving the signal B, the valve drive circuit 30 drives the hydraulic unit 31 in accordance with the signal B.

Thus, according to this embodiment, the operations of the two microcomputers, the microcomputer 24B which intrinsically performs the control of the anti-skid braking system, and the microcomputer 4B which intrinsically performs the control of the power steering, are monitored mutually between them. Only when the the fail-safe relay energization signals output from the two microcomputers coincide, the power is supplied to the circuits of the power steering control system and the anti-skid braking system. Further, only when the direction signals output from the two microcomputers coincide, the DC motor 9 of the power steering control system is driven. The single relay of the fail-safe relay unit 6B serves both for controlling the power supply to the power steering control system and the anti-skid braking system. As a result, the circuit structure is simplified and the cost is reduced, compared with the first embodiment of FIG. 1. At the same time, the fail-safe function is as reliable.

Figure 3:
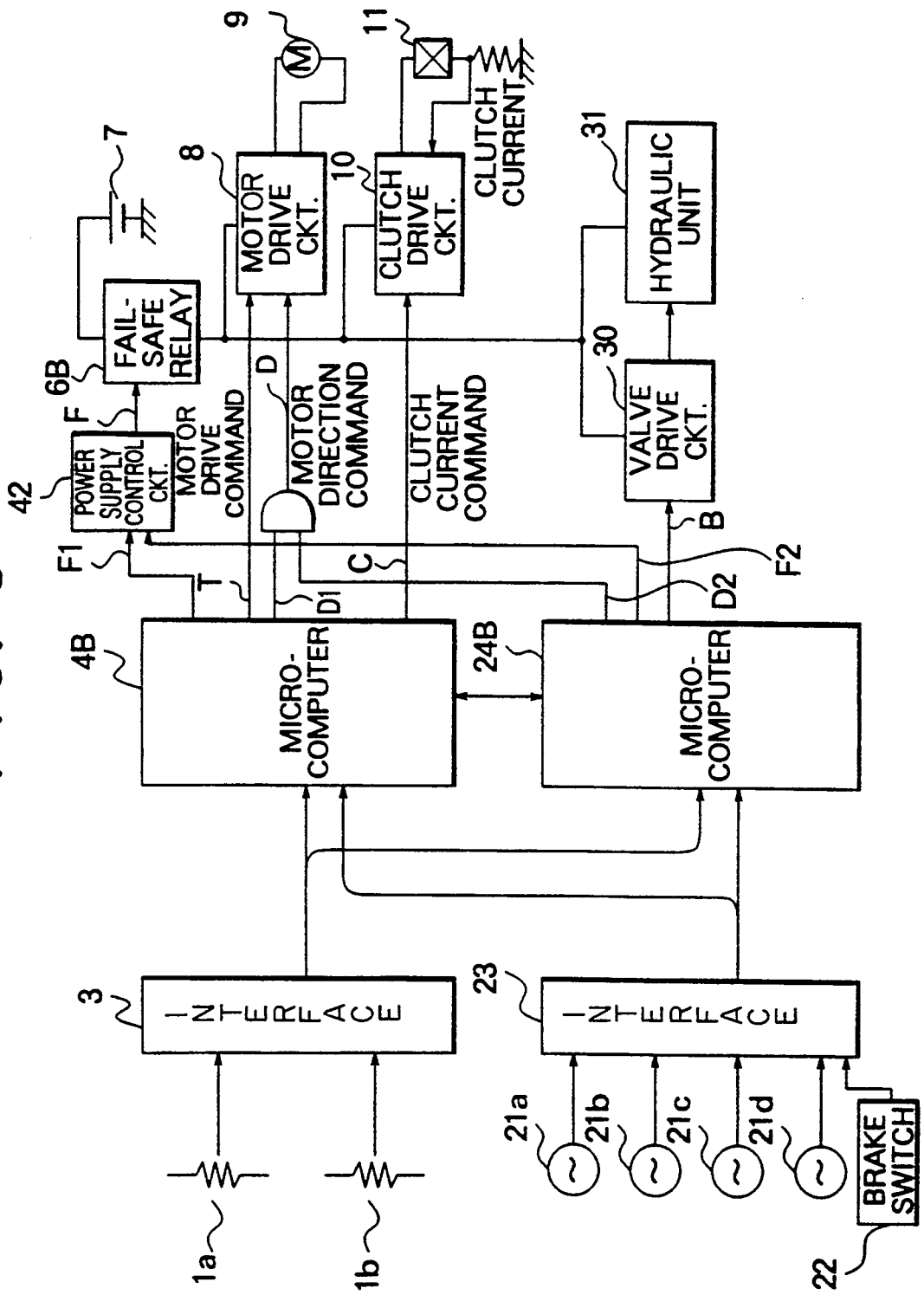
FIG. 3 is a block diagram showing the structure of still another control device for a vehicle according to this invention.

FIG. 3 is a block diagram showing the structure of still another control device for a vehicle according to this invention. The circuit is similar to that of FIG. 2, except that the AND circuit 41 of FIG. 2 is replaced by a power supply control circuit 42. The method of operation of the power supply control circuit 42 and the fail-safe relay unit 6B is as follows.

The fail-safe relay unit 6B includes a single relay which controls the current supply both to the power steering control system (the motor drive circuit 8 and the clutch drive circuit 10) and the anti-skid braking system (the valve drive circuit 30 and the hydraulic unit 31). In response to the fail-safe relay energization signal signals F1 and F2 supplied from the microcomputer 4B and the 24B, respectively, the power supply control circuit 42 controls the operation of the fail-safe relay unit 6B. When both the power steering control system and the anti-skid braking system are operating normally, both the fail-safe relay energization signals F1 and F2 are supplied from the microcomputer 4B and 24B, respectively. Then, the power supply control circuit 42 immediately energizes the fail-safe relay unit 6B, such that the power from the battery 7 is supplied to the respective circuits of the power steering control system and the anti-skid braking system (i.e., the motor drive circuit 8, the clutch drive circuit 10, the valve drive circuit 30 and the hydraulic unit 31). On the other hand, when both the power steering control system and the anti-skid braking system are operating abnormally, neither the signal F1 nor the signal F2 are supplied from the microcomputer 4B and the 24B, respectively. Then, the power supply control circuit 42 immediately de-energizes the fail-safe relay unit 6B, such that the power supply from the battery 7 to the respective is interrupted. Furthermore, when either the power steering control system or the anti-skid braking system is operating abnormally or in failure but the other is normal, one of the fail-safe relay energization signals F1 and F2 is supplied from the microcomputer 4B or 24B to the power supply control circuit 42, but not the other. Then, the power supply control circuit 42 temporarily defers the de-energization of the fail-safe relay unit 6B, and temporarily defers the interruption of the power from the battery 7 to the respective circuits. This temporal deferment operation of the power supply control circuit 42 is described in detail below. In FIG. 3, the power supply control circuit 42 is represented as a separate circuit. However, the function of the power supply control circuit 42 may be performed by the microcomputer 4B or the microcomputer 24B.

Next, the operation of the circuit of FIG. 3 is described in detail. Upon commencement of the operation of the vehicle, the microcomputer 4B confirms the operation of the power steering control system on the basis of the outputs of the respective sensors. If the operation of the power steering control system is determined to be normal, the microcomputer 4B outputs the fail-safe relay energization signal F1 to put the power steering control system into operation. Similarly, upon commencement of the operation of the vehicle, the microcomputer 24B confirms the operation of the anti-skid braking system on the basis of the outputs of the respective sensors. If the operation of the anti-skid braking system is determined to be normal, the microcomputer 24B outputs the fail-safe relay energization signal F2 to put the anti-skid braking system into operation.

The fail-safe relay energization signals F1 and F2 are supplied from the microcomputers 4B and 24B to the power supply control circuit 42. If the power steering control system and the anti-skid braking system are operating normally, both the two energization signal F1 and F2 are supplied from the microcomputer 4B and the microcomputer 24B. In response thereto, the power supply control circuit 42 outputs the control signal F to the fail-safe relay unit 6B, such that the fail-safe relay unit 6B is energized and the power from the battery 7 is supplied to the motor drive circuit 8 and the clutch drive circuit 10 of the power steering control system, on the one hand, and to the valve drive circuit 30 and the hydraulic unit 31 of the anti-skid braking system, on the other.

If, on the other hand, the operation of the power steering control system is determined to be abnormal upon commencement of the operation of the vehicle, the microcomputer 4B does not output the fail-safe relay energization signal F1 for the power steering control system. Similarly, if the operation of the anti-skid braking system is determined to be abnormal upon commencement of the operation of the vehicle, the microcomputer 24B does not output the fail-safe relay energization signal F2 for the anti-skid braking system. Thus, when both the power steering control system and the anti-skid braking system are operating abnormally, neither of the energization signals F1 and F2 is supplied to the power supply control circuit 42. Then, the power supply control circuit 42 de-energizes the fail-safe relay unit 6B immediately, thereby interrupting the power supply from the battery 7 to the motor drive circuit 8 and the clutch drive circuit 10 of the power steering control system, and to the valve drive circuit 30 and the hydraulic unit 31 of the anti-skid braking system.

On the other hand, when either the power steering control system or the anti-skid braking system is operating abnormally but the other is normal, only one of the signals F1 and F2 is supplied to the power supply control circuit 42. Then, the power supply control circuit 42 temporarily defers the de-energization of the fail-safe relay unit 6B. After temporal deferment of the interruption of the power from the battery 7 to the respective circuits (the motor drive circuit 8, the clutch drive circuit 10, the valve drive circuit 30, the hydraulic unit 31), the power supply control circuit 42 de-energizes the fail-safe relay unit 6B to interrupt the power supply.

When the operations of the power steering control system and the anti-skid braking system are normal and the power from the battery 7 is thus supplied to the respective circuits, the microcomputer 4B supplies the clutch current command signal C to the clutch drive circuit 10. In response to the signal C, the clutch drive circuit 10 outputs a PWM (pulse-width modulated) drive signal to the clutch 11. The clutch current level of the clutch 11 is fed back to the clutch drive circuit 10, for the purpose of detecting abnormality of the clutch 11.

Next the microcomputer 4B reads in the steering torque information supplied from the torque sensors 1a and 1b at the operation of the steering wheel, and the road wheel velocity information supplied from the road wheel velocity sensors 21a through 21d. The microcomputer 4B determines the driving direction of the DC motor 9 on the basis of the steering torque information, and the driving torque of the DC motor 9 on the basis of the steering torque information and the road wheel velocity information. On the basis of the driving direction and the driving torque of the DC motor 9 thus determined, the microcomputer 4B outputs the direction signal D1 and the torque signal T for the DC motor 9.

On the other hand, the microcomputer 24B reads in, through the interface 23, the road wheel velocity information from the road wheel velocity sensors 21a through 21d, and the braking force information from the brake switch 22. On the basis of the road wheel velocity information and the braking force information, the microcomputer 24B generates the braking operation signal B for the road wheels, which is the signal for controlling the anti-skid braking system. Further, the microcomputer 24B reads in the steering torque information supplied from the torque sensors 1a and 1b at the operation of the steering wheel, and determines on the basis of the steering torque information the driving direction of the DC motor 9. On the basis of the driving direction of the DC motor 9 thus determined, the microcomputer 24A generates the direction signal D2 for the DC motor 9.

When the direction signals D1 and D2 from the microcomputers 4B and 24B coincide, the AND circuit 40 opens the gate thereof and outputs the motor direction command signal D to the motor drive circuit 8. Upon receiving the motor direction command signal D supplied from the AND circuit 40 and the torque signal T (i.e., the motor drive command signal) directly and continuously supplied from the microcomputer 4B, the motor drive circuit 8 is activated and outputs the drive signal to the DC motor 9, thereby driving the DC motor 9.

Further, the braking operation signal B for the road wheels output from the microcomputer 24B is supplied to the valve drive circuit 30. Upon receiving the signal B, the valve drive circuit 30 drives the hydraulic unit 31 in accordance with the signal B.

Figure 4:
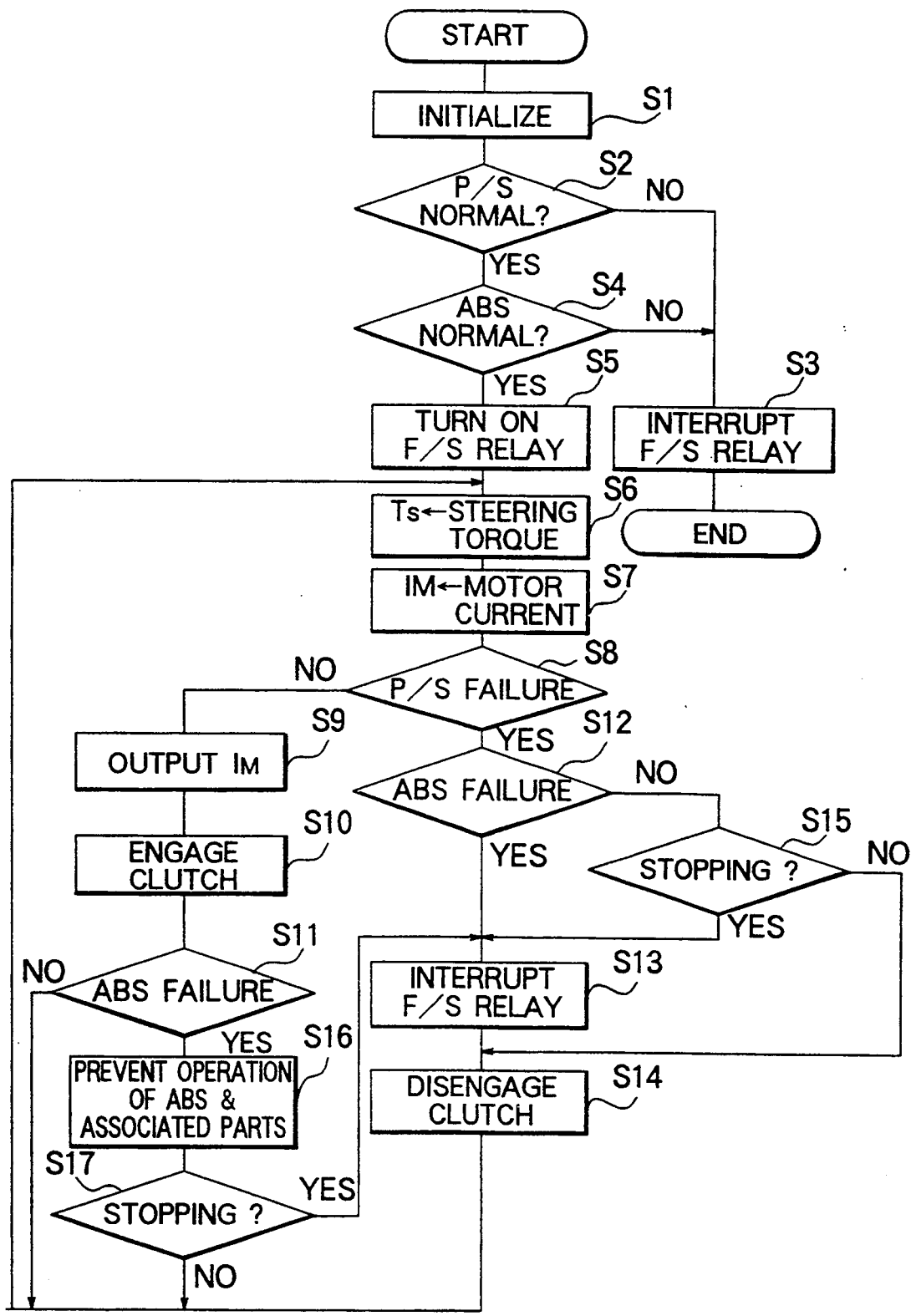
FIG. 4 is a flowchart showing the method of operation of the control device for a vehicle of FIG. 3.

Next, referring to FIG. 4, the operation of the circuit of FIG. 3 is described in greater detail. FIG. 4 is a flowchart showing the method of operation of the control device for a vehicle of FIG. 3.

At step S1, the whole control device is initialized. At step S2, the micrcomputer 4B judges whether or not the circuits other than the driving system such as the motor drive circuit 8 and the clutch drive circuit 10 of the power steering control system are operating normally. If the judgment is negative (i.e., if there are abnormally operating circuits, other than the driving system, of the power steering control system), the execution proceeds to step S3, where the fail-safe relay unit 6B is opened (interrupted) if it is not already open. (The fail-safe relay unit 6B should be initially open.) After step S3, the execution is terminated while the fail-safe relay unit 6B is kept in the open state.

If the judgment is affirmative at step S2 (i.e., the power steering control system is operating normally), the execution proceeds to step S4, where the microcomputer 24B judges whether or not the circuits other than the driving system such as the valve drive circuit 30 and the hydraulic unit 31 of the anti-skid braking system are operating normally. If the judgment is negative (i.e., if there are abnormally operating circuits, other than the driving system, of the anti-skid braking system), the execution proceeds to step S3, where the fail-safe relay unit 6B is opened if it is not already open, and then is terminated as described above.

If the judgment is affirmative at step S4, namely, if the circuits, other than the driving system, of the power steering control system and the anti-skid braking system are operating normally, the execution proceeds step S5, where both the energization signals F1 and F2 are output to the power supply control circuit 42. In response thereto, the power supply control circuit 42 energizes the fail-safe relay unit 6B to supply the power from the battery 7 both to the motor drive circuit 8 and the clutch drive circuit 10 of the power steering control system, and to the valve drive circuit 30 and the hydraulic unit 31 of the anti-skid braking system.

At step S6, the microcomputer 4B determines the steering torque $T_S$ on the basis of the outputs of the torque sensors 1a and 1b. The steering torque thus determined is stored as parameter $T_S$. Further, at step S7, the microcomputer 4B reads out the motor current $I_M$ corresponding to the steering torque $T_S$ determined at step S6. Namely, the microcomputer 4B looks up a table stored beforehand in the memory thereof, which shows the relationship between the values of the steering torque $T_S$ and the motor current $I_M$, and the microcomputer 4B thereby determines the motor current $I_M$ corresponding to the steering torque $T_S$. The motor current thus determined is stored in the memory as parameter $I_M$.

Next at step S8, it is judged whether or not the power steering control system is in failure. If the judgment is negative (i.e., if it is not in failure), the execution proceeds to step S9, where the motor current $I_M$ as determined and stored at step S7 is read out of the memory and output to the motor drive circuit 8 as the torque signal T. Further, in response to the direction signals D1 and D2 output from the microcomputers 4B and 24B, the AND circuit 40 supplies the direction signal D to the motor drive circuit 8. The motor drive circuit 8 drives the DC motor 9 in accordance with the torque signal T and the direction signal D. Next at step S10, the microcomputer 4B outputs the clutch current signal C to the clutch drive circuit 10. In response thereto, the clutch drive circuit 10 engages the clutch 11. Further at step S11, the microcomputer 24B judges whether or not the anti-skid braking system is in failure. If the judgment is negative (i.e., if it is not in failure), the execution returns to step S6 to repeat the subsequent steps. On the other hand, if the judgment is affirmative at step S11, the execution proceeds to step S16, where the operations of the anti-skid braking system and the parts associated therewith are prevented. Further at step S17, it is judged whether or not the vehicle is at a stop. If the judgment is negative, the execution returns to step S6 to repeat the subsequent steps. Since it is dangerous if the anti-skid braking system erroneously operates during the time when the vehicle is running, the operations of the anti-skid braking system and the parts associated therewith are prevented at step S16 to eliminate the danger. When, however, the vehicle is judged to be at a stop at step S17, the execution proceeds to step S13, where the fail-safe relay unit 6A is interrupted via the power supply control circuit 42 as described above, and then at step S14, the clutch 11 is interrupted.

On the other hand, if the judgment is affirmative at step S8 (i.e., the power steering control system is in failure), the execution proceeds to step S12, where the microcomputer 24A judges whether or not the anti-skid braking system is in failure. If the judgment is affirmative at step S12 (i.e., if it is in failure), the execution proceeds to step S13, where the power supply control circuit 42 immediately interrupts the fail-safe relay unit 6B since neither of the signals F1 and F2 is supplied from the microcomputers 4B and 24B. At step S14, the clutch 11 is disengaged. On the other hand, if the judgment is negative at step S12, the execution proceeds to step S15, where it is judged whether or not the vehicle is at a stop. If the judgment is affirmative at step S15, the execution proceeds to step S13 to be followed by step S14, as described above. If the judgment is negative at step S15, on the other hand, the execution proceeds directly to step S14, to interrupt and disengage the clutch 11 only. Namely, if the anti-skid braking system is operating normally (the judgment at step S12 is negative) and the vehicle is running (the judgement at step S15 is negative), the fail-safe relay unit 6B is not de-energized and the power supply from the battery 7 to the respective circuits is maintained even if the power steering control system is in failure. Only when the vehicle stops, the power supply control circuit 42 de-energizes the fail-safe relay unit 6B to interrupt the power supply from the battery 7 to respective circuits.

In the case of the control device of FIG. 2, the failure of either the power steering control system or the anti-skid braking system may disable the operation of the other. This is an inconvenience resulting from the unification of the power steering control system and anti-skid braking system. According to the third embodiment of FIG. 3 which the follows the control procedure of FIG. 4, however, the interruption of the fail-safe relay unit 6B is deferred until the vehicle stops if either the power steering control system or the anti-skid braking system fails.

For example, assume first that the anti-skid braking system fails but the steering control system is normally operating. Assume further that the vehicle is running. Then, the execution of the procedure of FIG. 4 repeats the steps S6 through step S11, and S16 and S17 until the vehicle stops. Thus, the operations of the anti-skid braking system and the parts associated therewith are prevented at step S16 but the interruption of the fail-safe relay unit 6B is deferred until the vehicle stops. When the vehicle stops, the execution proceeds from step S17 to step S13, and the fail-safe relay unit 6B is finally interrupted.

Assume next that a failure occurs in the power steering control system but the anti-skid braking system is normal while the vehicle is running. Then, the execution cycles the steps S6, S7, step S8, S12, S15, and S14 until the vehicle stops. Thus, the clutch 11 of the power steering control system is disengaged at step S14 but the interruption of the fail-safe relay unit 6B is deferred until the vehicle stops. When the vehicle stops, the execution proceeds from step S15 to step S13, and the fail-safe relay unit 6B is finally interrupted.

Thus, in the case of the third embodiment of FIGS. 3 and 4, the above mentioned disadvantage resulting from the unification of the anti-skid braking system and the power steering control system is eliminated.

What is claimed is:

1. A control device for a vehicle including an anti-skid braking system and power steering control system including an electric motor for proving an assisting steering torque for a steering wheel of said vehicle, said control device comprising:

torque sensor means for determining a torque of said steering wheel;

road wheel velocity sensor means for detecting velocities of road wheels of said vehicle;

brake sensor means for detecting an operation of a brake of said vehicle;

first control means, coupled to said torque sensor means, for determining a driving direction and a driving torque of said electric motor on the basis of an output of said torque sensor means, said first control means generating a first direction signal and a torque signal for said electric motor on the basis of said driving direction and said driving torque of said electric motor determined by said first control means;

second control means, coupled to said torque sensor means, said road wheel velocity sensor means and said brake sensor means, for generating a brake operation signal for said anti-skid braking system on the basis of outputs of said road wheel velocity sensor means and said brake sensor means, wherein said second control means determines a driving direction of said electric motor on the basis of said output of said torque sensor means and outputs a second direction signal for said electric motor on the basis of said direction of said electric motor determined by said second control means;

logical circuit means, coupled to said first and second control means, for generating a direction command signal, coinciding with said first and second direction signals, only when said first and second direction signals output from said first and second control means, respectively, coincide; and motor drive circuit means coupled to said first control means and said logical circuit means, said motor drive circuit means driving said electric motor in accordance with said torque signal and said direction command signal.

2. A control device as claimed in claim 1, wherein said first and second control means include means, respectively, for judging whether or not said power steering control system and said anti-skid braking system are operating normally, and output a first and a second fail-safe relay energization signal, respectively, when said power steering control system and said anti-skid braking system are judged to be operating normally;

said control device further comprising a fail-safe relay unit for controlling a power supply to said power steering control system and said anti-skid braking system, in accordance with said first and second fail-safe relay energization signal.

3. A control device as claimed in claim 2, further comprising second logical circuit means having inputs coupled to said first and second control means, said second logical circuit means generating a third fail-safe relay energization signal only when both said first and second fail-safe relay energization signals are output from said first and second control means, respectively;

wherein said fail-safe relay unit is coupled to an output of said second logical circuit means and includes a single fail-safe relay which is turned on to supply power to said anti-skid braking system and said power steering control system when said third fail-safe relay energization signal is output.

4. A control device as claimed in claim 2, wherein:

said fail-safe relay unit includes a single fail-safe relay for controlling current supply to said anti-skid braking system and said power steering control system; and said control device further comprises: power supply control circuit means having inputs coupled to said first and second control means and controlling said single fail-safe relay of said fail-safe relay unit;

wherein said power supply control circuit means turns on said single fail-safe relay to supply power to said anti-skid braking system and said power steering control system when both said first and second fail-safe relay energization signals are output, immediately interrupts said single fail-safe relay when neither said first nor said second fail-safe relay energization signals is output, and interrupts said single fail-safe relay after a deferment when only one of said first and second fail-safe relay energization signals is output.

5. A control device as claimed in claim 4, wherein said power supply control circuit means defers interruption of said single fail-safe relay until said vehicle stops, when only one of said first and second fail-safe relay energization signals is output.

* * * * *